(12) United States Patent
Yin et al.

(10) Patent No.: US 11,251,671 B2
(45) Date of Patent: Feb. 15, 2022

(54) HIGH-POWER MOTOR CONTROLLED BY PARALLELLY CONNECTED WINDINGS

(71) Applicant: BIJIE TIANYU POWER TECHNOLOGY CO., LTD, Bijie (CN)

(72) Inventors: Tianming Yin, Bijie (CN); Yan Wang, Bijie (CN)

(73) Assignee: BIJIE TIANYU POWER TECHNOLOGY CO., LTD, Bijie (CN)

( * ) Notice: Subject to any disclaimer, the term of this patent is extended or adjusted under 35 U.S.C. 154(b) by 21 days.

(21) Appl. No.: 16/731,062

(22) Filed: Dec. 31, 2019

(65) Prior Publication Data

US 2020/0136455 A1   Apr. 30, 2020

Related U.S. Application Data

(63) Continuation of application No. PCT/CN2017/099089, filed on Aug. 25, 2017.

(51) Int. Cl.
| | | |
|---|---|---|
| *H02K 3/28* | (2006.01) | |
| *H02K 11/33* | (2016.01) | |
| *H02K 17/14* | (2006.01) | |
| *H02M 7/5388* | (2007.01) | |

(52) U.S. Cl.
CPC .............. *H02K 3/28* (2013.01); *H02K 11/33* (2016.01); *H02K 17/14* (2013.01); *H02M 7/5388* (2013.01)

(58) Field of Classification Search
CPC ........ H02M 1/007; H02M 1/34; H02M 1/346; H02M 7/487; H02M 7/538; H02M 7/48; H02M 7/5387; H02M 5/458; H02M 3/158; H02M 3/1584; H02M 3/1586
USPC ................................ 323/222, 282; 361/91.7
See application file for complete search history.

(56) References Cited

U.S. PATENT DOCUMENTS

| | | | | |
|---|---|---|---|---|
| 6,011,377 A | * | 1/2000 | Heglund | .................... H02P 9/40 |
| | | | | 318/254.2 |
| 2007/0290640 A1 | * | 12/2007 | Williams | ............ H02M 7/5387 |
| | | | | 318/400.42 |
| 2015/0061612 A1 | | 3/2015 | Bernoux et al. | |

FOREIGN PATENT DOCUMENTS

| | | |
|---|---|---|
| CN | 201113672 Y | 9/2008 |
| CN | 102497055 A | 6/2012 |
| CN | 103475292 A | 12/2013 |
| CN | 105048888 A | 11/2015 |
| CN | 106788106 A | 5/2017 |

OTHER PUBLICATIONS

International search report,PCT/CN2017/099089, dated Mar. 3, 2018 (3 pages).

* cited by examiner

*Primary Examiner* — Bryan R Perez

(57) ABSTRACT

A high-power motor controlled by parallelly connected windings is provided. The motor comprises multi-phase windings. Each phase includes n winding branches and 2n power devices, wherein the n winding branches are connected in parallel with each other, and each winding branch is independently controlled by a power device.

2 Claims, 4 Drawing Sheets

HIGH-POWER MOTOR CONTROLLED BY PARALLELLY CONNECTED WINDINGS

CROSS-REFERENCE OF RELATED APPLICATIONS

The present application is a continuation-application of International (PCT) Patent Application No. PCT/CN2017/099089 filed on Aug. 25, 2017, the entire contents of which are hereby incorporated by reference in their entireties

TECHNICAL FIELD

The present disclosure relates to the field of motors, and in particular to a high-power motor controlled by parallelly connected windings.

BACKGROUND

A power component is typically arranged to control a motor. The power component may be an insulated gate bipolar transistor (IGBT), a metal-oxide-semiconductor field-effect transistor (MOSFET), a giant transistor (GTR), or an integrated gate commutated thyristor (IGCT). As shown in FIG. 1, in a motor, each phase of windings may include two independent power components and one independent phase of winding. An electric current may flow through a point E, and conduction of each phase of the motor may be controlled by controlling the power components. However, a high-power component may be required to control a high-power motor, and only limited types of the high-power components are available. Therefore, finding an appropriate high-power component may be difficult, and a cost of the appropriate high-power component may be high.

According to the related art, power components may be connected in parallel and then connected in series to phase windings. As shown in FIG. 2, windings of each phase of the motor may include 2n independent power components and an independent phase of windings. After the electric current flows into the motor through the point E, the electric current may be shunted by n of combined power components, and the combined power components may be combined from two independent power components, such that the high-power motor may be controlled through a low-power component. However, such a method may be impacted by consistency of various power components, therefore, a technical problem of achieving equal current of each power component needs to be solved.

SUMMARY

The present disclosure may provide a high-power motor controlled by parallelly connected windings. The high-power motor may include windings of a plurality of phases. The windings of each phase include n winding branches and 2n power components. The n winding branches are connected with each other in parallel. Each of the n winding branches is controlled by two of the 2n power components independently from other winding branches.

When the windings are asymmetrically connected in a half-bridge manner, the plurality of phases include m phases, and the windings of each of the m phases include a first power component, a sub-winding, and a second power component.

Each of the n winding branches includes the first power component Tm1$n$, the sub-winding Lmn, and the second power component Tm2$n$. The first power component Tm1$n$ and the second power component Tm2$n$ are connected to two ends of the sub-winding Lmn, such that the first power component Tm1$n$, the sub-winding Lmn, and the second power component Tm2$n$ are connected in series.

When the windings are connected to form a shape of a triangle, the windings of the plurality of phases are three-phase windings, the three-phase windings are windings of a phase A, windings of a phase B, and windings of a phase C. Each winding branch of the phase A, the phase B, and the phase C includes a first power component, a sub-winding, and a second power component.

A winding branch of the phase A includes the first power component TA1$n$ of the phase A, the sub-winding LnA of the phase A, and the second power component TA2$n$ of the phase A. A winding branch of the phase B includes the first power component TB1$n$ of the phase B, the sub-winding LnB of the phaseB, and the second power component TB2$n$ of the phase B. A winding branch of the phase C includes the first power component TC1$n$ of the phase C, the sub-winding LnC of the phase C, and the second power component TC2$n$ of the phase C.

A first end of the first power component TA1$n$ of the phase A is connected to a positive pole of a power, and a second end of the first power component TA1$n$ of the phase A is connected to a first end of the sub-winding LnA of the phase A, a first end of the sub-winding LnC of the phase C, and a first end of the second power component TA2$n$ of the phase A. A second end of the sub-winding LnA of the phase A is connected to a second end of the first power component TB1$n$ of the phase B, a first end of the second power component TB2$n$ of the phase B, and a first end of the sub-winding LnB of the phase B, and a second end of the second power component TA2$n$ is connected to a ground.

A first end of the first power component TB1$n$ of the phase B is connected to the positive pole of the power, and a second end of the first power component TB1$n$ of the phase B is connected to the second end of the sub-winding LnA of the phase A, the first end of the second power component TB2$n$ of the phase B, and the first end of the sub-winding LnB of the phase B. A second end of the sub-winding LnB of the phase B is connected to a second end of the first power component TC1$n$ of the phase C and a first end of the second power component TC2$n$ of the phase C, and a second end of the second power component TB2$n$ is connected to the ground.

A first end of the first power component TC1$n$ of the phase C is connected to the positive pole of the power, and the second end of the first power component TC1$n$ of the phase C is connected to a second end of the sub-winding LnC of the phase C and the second end of the sub-winding LnB of the phase B, and a second end of the second power component TC2$n$ of the phase C is connected to the ground.

When the windings are connected in a star configuration, the windings of the plurality of phases are three-phase windings, the three-phase windings include windings of a phase A, windings of a phase B, and windings of a phase C. Each winding branch of the phase A, the phase and the phase C includes a first power component, a sub-winding, and a second power component.

A winding branch of the phase A includes the first power component TA1$n$ of the phase A, the sub-winding LnA of the phase A, and the second power component TA2$n$ of the phase A. A winding branch of the phase B includes the first power component TB1$n$ of the phase B, the sub-winding LnB of the phase B, and the second power component TB2$n$ of the phase B. A winding branch of the phase C includes the first power component TC1n of the phase C, the sub-winding LnC of the phase C, and the second power component TC2n of the phase C.

A first end of the first power component TA1n of the phase A is connected to a positive pole of a power, a second end of the first power component TA1n of the phase A is connected to a first end of the sub-winding LnA of the phase A and a first end of the second power component TA2n of the phase A, and a second end of the second power component TA2n is connected to a ground.

A first end of the first power component TB1n of the phase B is connected to the positive pole of the power, a second end of the first power component TB1n of the phase B is connected to a first end of the sub-winding LnB of the phase B and a first end of the second power component TB2n of the phase B, and a second end of the second power component TB2n is connected to the ground.

a first end of the first power component TC1n of the phase C is connected to the positive pole of the power, a second end of the first power component TC1n of the phase C is connected to a first end of the sub-winding LnC of the phase C and a first end of the second power component TC2n of the phase C, and a second end of the second power component TC2n of the phase C is connected to the ground.

A second end of the sub-winding LnA of the phase A, a second end of the sub-winding LnB of the phase B, and a second end of the sub-winding LnC of the phase C are connected with each other.

BRIEF DESCRIPTION OF THE DRAWINGS

To illustrate technical solutions of the present disclosure in more details, drawings needed for illustrating embodiments of the present disclosure will be briefly described. Obviously, the drawings included in following descriptions may show only some embodiments of the present disclosure. To an ordinary skilled in the art, other drawings may be obtained based on the provided drawings without any creative work.

DETAILED DESCRIPTION

Figure 1:
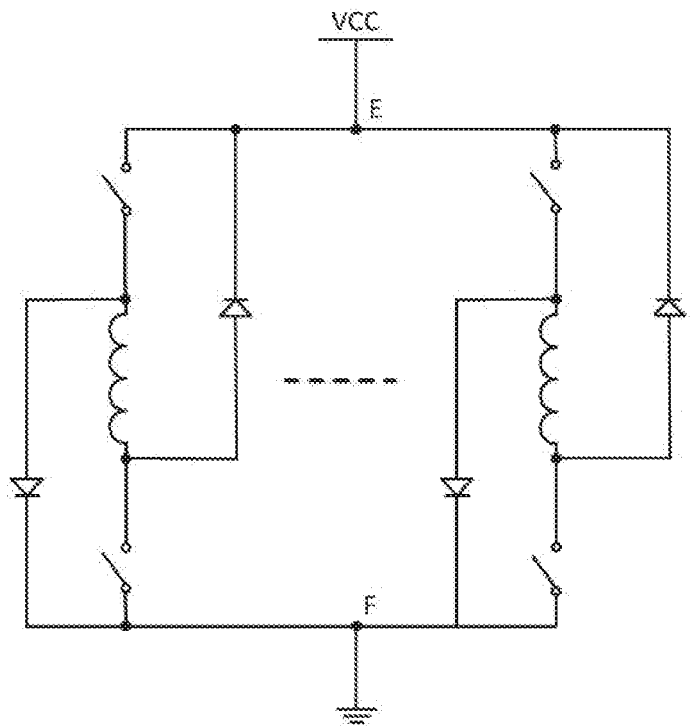
FIG. 1 is a structural schematic view of a high-power power component controlling a high-power motor according to the related art.
Figure 2:
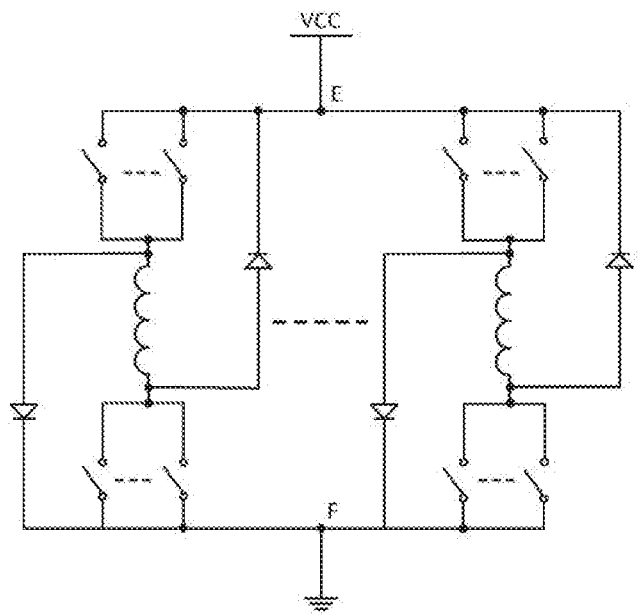
FIG. 2 is a structural schematic view of a low-power power component controlling a high-power motor according to the related art.

Technical solutions provided by embodiments the present disclosure may be illustrated clearly and comprehensively by referring to the drawings. Obviously, the illustrated embodiments are only a part of but not all of the embodiments. Based on the embodiments of the present disclosure, any other embodiments obtained by the ordinary skilled in the related art without any creative work may be within the scope of the present disclosure.

Figure 3:
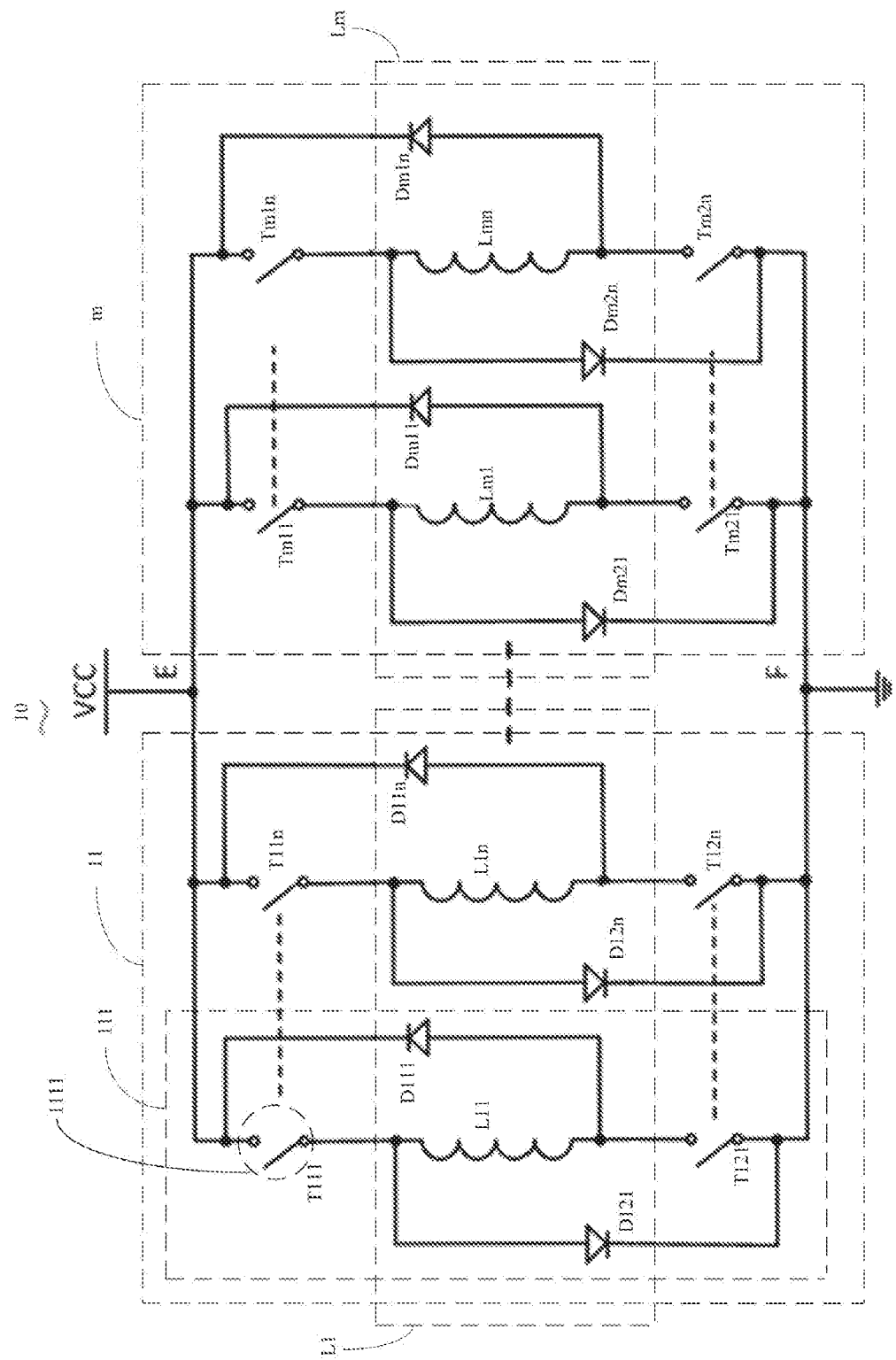
FIG. 3 is a circuit diagram showing a high-power motor controlled by parallelly connected windings according to a first embodiment of the present disclosure.

As shown in FIG. 3, a circuit diagram showing a high-power motor controlled by parallelly connected windings may be provided by a first embodiment of the present disclosure. A motor 10 provided by the present embodiment may include windings 11. Further, the windings of a plurality of phases may be provided, such as two-phase windings, three-phase winding, or windings of m phases labeled as m in FIG. 3. The m may be greater than or equal to 1. The windings 11 may include at least two winding branches 111, that is, the windings 11 may include n winding branches ill connected with each other in parallel. The n may be greater than or equal to 2.

The motor provided in the present embodiment may take the windings 11 of one phase as an example. Windings 11 of other phases may work similarly as the windings 11 do, and will not be repeatedly described herein.

To be specific, each winding branch 111 may include at least one sub-winding L1n and two power components 1111 connected in series to the sub-winding L1n. As shown in FIG. 3, a first winding branch 111 of the windings 11 may include a sub-winding L11 and two power components 1111 connected in series to the sub-winding L11. The two power components 1111 may be a power component T11 and a power component T21. The power component T11, the sub-winding L11, and the power component T21 may be connected in series.

The sub-winding L11 may be arranged on one of the winding branches 111, and another sub-winding L1n may be arranged on another one of the winding branches 111. The sub-winding L11 and the another sub-winding L1n may wind to form a winding integral L1. For example, the windings 11 may include n winding branches 111, and the n winding branches 111 may include a sub-winding L11, a sub-winding L12, . . . , and a sub-winding L1n. The sub-winding L11, the sub-winding L12, . . . , and the sub-winding L1n may wind to form a winding integral L1.

A rated power of the power component 1111 arranged on each parallelly connected winding branch, i.e., each of the n winding branches, may be greater than an actual power required by the sub-winding L1n arranged on a same winding branch.

The rated power of the power component T11 may be greater than the actual power of the winding branch 111 arranged with the power component T11 when the windings 11 are working. Therefore, when the winding branch 111 is at work or at rest, one of the power component T11 and the power component T12 may be protected from damage caused by excessive currents.

The winding branch 111 may include an electronic element D111 and an electronic element D121. Each of the electronic element D111 and the electronic element D121 may be a freewheeling diode.

An operational principle will be illustrated in details.

The winding integral L1 may be divided into the sub-winding L11, the sub-winding L12, . . . , and the sub-winding L1n, that is, the sub-winding L11, the sub-winding L12, . . . , and the sub-winding L1n may wind to form the winding integral L1.

The sub-winding L11 may be controlled via two low-power components T11 and T21. The sub-winding L12 may be controlled via two low-power components T12 and T22. The sub-winding L1n may be controlled via two low-power components T1n and T2n. When the power components T1n and T2n are conducted at the same time, the sub-winding L1n corresponding to the power components T1n and T2n may start working.

The power component Tin corresponding to the sub-winding L1n and the power component T2n corresponding to the sub-winding L1n may be independent. Similarly, in each winding branches, the two power components may be independent. Therefore, parallelly connected power components 1111 in each of the n winding branches may not be required to have an equal current, and the power component 1111 may be protected from being burnt.

The sub-winding L11, the sub-winding L12, . . . , and the sub-winding L1n may be connected in parallel, such that reliability and redundancy of the windings 11 of the motor may be improved.

Further, the present embodiment may provide the low-power component 1111 to control the high-power motor 10, manufacturing costs of the high-power motor 10 may be reduced.

Figure 4:
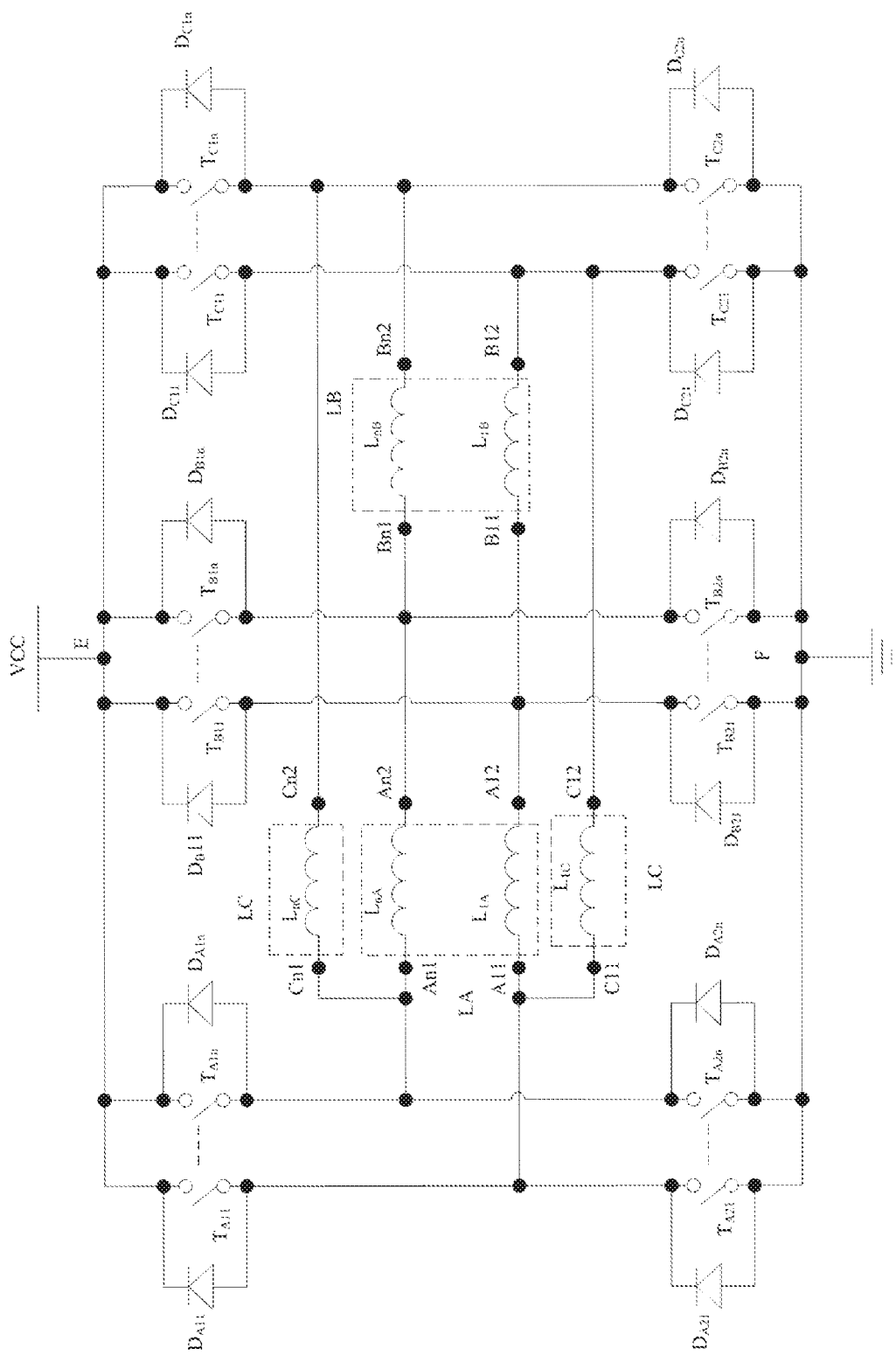
FIG. 4 is a circuit diagram showing a high-power motor controlled by parallelly connected windings according to a second embodiment of the present disclosure.

As shown in FIG. 4, a circuit diagram showing a high-power motor controlled by parallelly connected windings according to a second embodiment of the present disclosure may be provided. In the present embodiment, the windings of the motor may be connected to form a triangle. The motor may include three-phase windings, i.e., windings of phase A, windings of phase B, and windings of phase C. Winding branches of the phase A may include a first power component TA1n of the phase A, a sub-winding LnA of the phase A, and a second power component TA2n of the phase A. Winding branches of the phase B may include a first power component TB1n of the phase B, a sub-winding LnB of the phase B, and a second power component TB2n of the phase B. Winding branches of the phase C may include a first power component TC1n of the phase C, a sub-winding LnC the phase C, and a second power component TC2n the phase C. The present embodiment may illustrate a connection pattern among the three-phase windings in details.

A first parallel branch of each phase may be taken as an example. To provide an easy description, an end of the power component connected to a positive pole of a power may be termed as a first end, and the other end of the power component disconnected to the positive pole of the power or connected to a ground may be termed as a second end. To be specific, the first power component TA1n of the phase A may not only control the motor windings arranged on the parallel branch of the phase A, but also cooperate with the power component arranged on the parallel branch of another phase to perform tasks accordingly. Descriptions used herein are for the purposes of an easy understanding.

To be specific, a first end of the first power component TA11 of the phase A may be connected to the positive pole of the power, and a second end of the first power component TA11 of the phase A may be connected to a first end A11 of the sub-winding L1A of the phase A, a first end C11 of the sub-winding L1C of the phase C, and a first end of the second power component TA21 of the phase A. A second end A12 of the sub-winding L1A of the phase A may be connected to a second end of the first power component TB11 of the phase B, a first end of the second power component TB21 of the phase B, and a first end B11 of the sub-winding L1B of the phase B. A second end of the second power component TA21 of the phase A may be connected to the ground.

A first end of the first power component TB11 of the phase B may be connected to the positive pole of the power, and the second end of the first power component TB11 of the phase B may be connected to the second end A12 of the sub-winding L1A of the phase A, a first end of the second power component TB21 of the phase B, and the first end B11 of the sub-winding L1B of the phase B. A second end B12 of the sub-winding L1B of the phase B may be connected to a second end of the first power component TC11 of the phase C, a first end of the second power component TC21 of the phase C, and a second end C12 of the sub-winding L1C of the phase C. A second end of the second power component TB21 of the phase B may be connected to the ground.

A first end of the first power component TC11 of the phase C may be connected to the positive pole of the power, and the second end of the first power component TC11 of the phase C may be connected to the second end C12 of the sub-winding L1C of the phase C, the second end B12 of the sub-winding L1B of the phase B, and the second end of the second power component TC21 of the phase C. The second end of the second power component TC21 of the phase C may be connected to the ground.

The winding branches of the phase A may include an electronic element DA11 and an electronic element DA21. The winding branches of the phase B may include an electronic element DB11 and an electronic element DB21. The winding branches of the phase C may include an electronic element DC11 and an electronic element DC21. Each of the electronic element DA11, the electronic element DA21, the electronic element DB11, the electronic element DB21, the electronic element DC11, and the electronic element DC21 may be a freewheeling diode.

At least two winding branches of each phase may wind to form a winding integral. For example, the windings of the phase A may include n winding branches connected in parallel. Each of the n winding branches may include a sub-winding. Therefore, the n winding branches may include a sub-winding L1A, a sub-winding L2A, . . . , and a sub-winding LnA. The sub-windings L1A, L2A, . . . , and LnA may wind to form a winding integral LA. Similarly, the winding of the phase B may include a sub-winding L1B, a sub-winding L2B, . . . , and a sub-winding LnB, and the sub-windings L1B, L2B, . . . , and LnB may wind to form a winding integral LB. The winding of phase C may a sub-winding L1C, a sub-winding L2C, . . . , and a sub-winding LnC, and the sub-windings L1C, L2C, . . . , and LnC may wind to form a winding integral LC. The windings of the phase A, the windings of the phase B, and the windings of the phase C may form the motor.

In the present embodiment, each winding branch of the phase A, each winding branch of the phase B, and each winding branch of the phase C may be controlled independently. Therefore, the power components arranged on the winding branches may not be required to have an equal current, and the power components may be protected from being burnt.

Further, according to the present embodiment, low-power components may be arranged to control the high-power motor, reducing manufacture costs.

In the present embodiment, the first power component may be at least any one selected from the group consisting of: an insulated gate bipolar transistor (IGBT), a metal-oxide-semiconductor field-effect transistor (MOSFET), a giant transistor (GTR), and an integrated gate commutated thyristor (IGCT); and the second power component may be at least any one selected from the group consisting of: an insulated gate bipolar transistor (IGBT), a metal-oxide-semiconductor field-effect transistor (MOSFET), a giant transistor (GTR), and an integrated gate commutated thyristor (IGCT). In other embodiments, other power components may be arranged as the first and the second power components.

Figure 5:
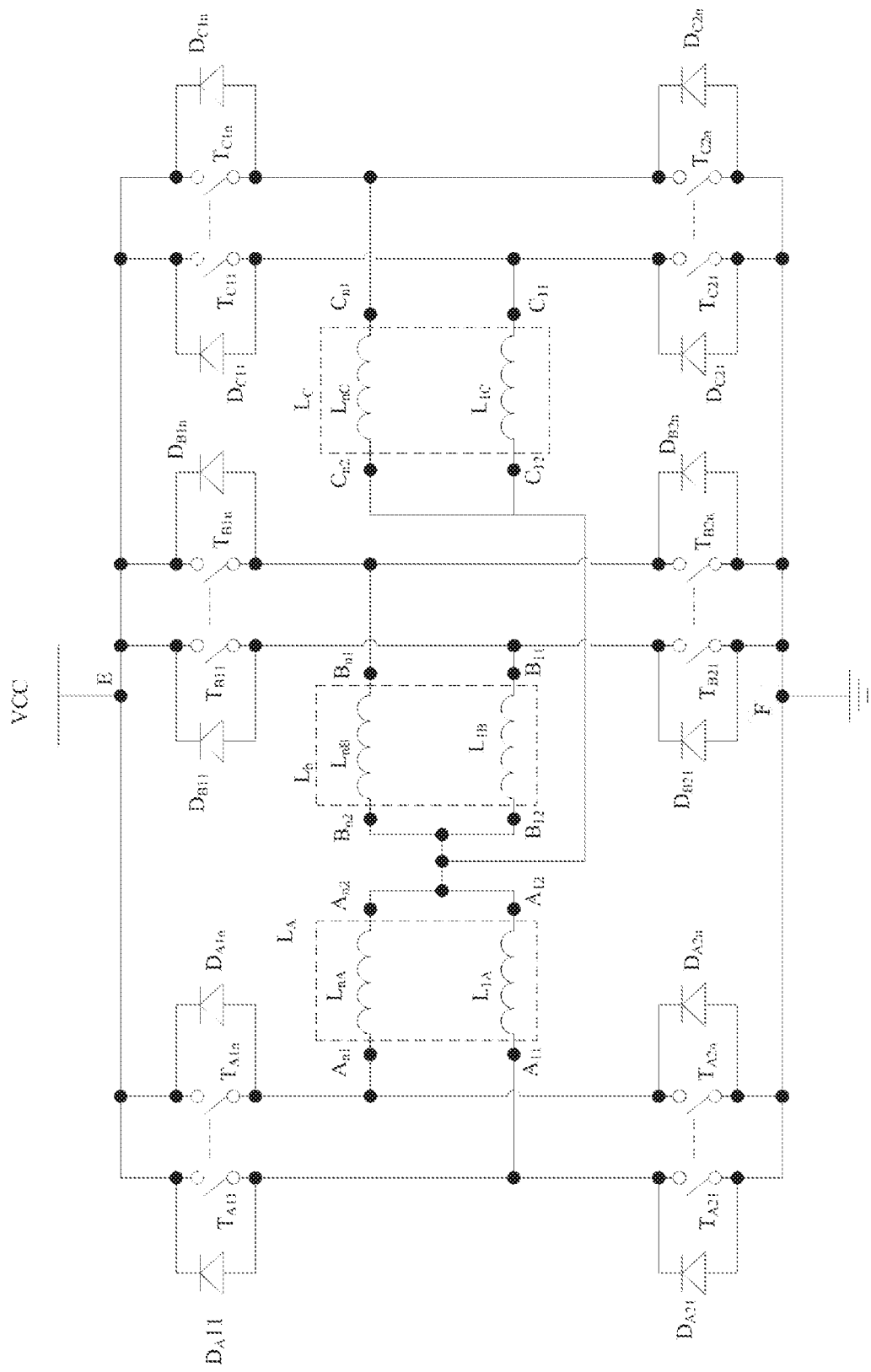
FIG. 5 is a circuit diagram showing a high-power motor controlled by parallelly connected windings according to a third embodiment of the present disclosure.

As shown in FIG. 5, a circuit diagram showing a high-power motor controlled by parallelly connected windings may be provided according to a third embodiment of the present disclosure. Referring to FIG. 5, the windings of the motor in the present embodiment may be connected to form a shape of a star. The motor may include three-phase windings, i.e., a winding of phase A, a winding of phase B, and a winding of phase C. Winding branches of the phase A may include a first power component TA1$n$ of the phase A, a sub-winding LnA of the phase A, and a second power component TA2$n$ of the phase A. Winding branches of the phase B may include a first power component TB1$n$ of the phase B, a sub-winding LnB of the phase B, and a second power component TB2$n$ of the phase B. Winding branches of the phase C may include a first power component TC1$n$ of the phase C, a sub-winding LnC of the phase C, and a second power component TC2$n$ of the phase C. In the present embodiment, a pattern of the above-mentioned connection may be described in details.

One of the winding branches of each phase may be taken as an example. In order to give an easy illustration, an end of the power component connected to a positive pole of a power may be termed as a first end, and the other end of the power component disconnected to the positive pole of the power or connected to the ground may be termed as a second end. To be specific, the first power component of the phase A TA1$n$ may not only control the windings arranged on the branch of the phase A, but also cooperate with the power components arranged on other parallel branches to perform tasks accordingly, wherein the other parallel branches may be connected to the branch on which the first power component TA1$n$ is arranged. Descriptions used herein are for the purposes of an easy understanding.

To be specific, a first end of the first power component TA11 of the phase A may be connected to the positive pole of the power, and a second end of the first power component TA11 of the phase A may be connected to a first end A11 of the sub-winding L1A of the phase A and a first end of the second power component TA21 of the phase A. A second end of the second power component TA21 of the phase A may be connected to the ground.

A first end of the first power component TB11 of the phase B may be connected to the positive pole of the power, and a second end of the first power component TB11 of the phase B may be connected to a first end B11 of the sub-winding L1B of the phase B and a first end of the second power component TB21 of the phase B. A second end of the second power component TB21 may be connected to the ground.

A first end of the first power component TC11 of the phase C may be connected to the positive pole of the power, and a second end of the first power component TC11 of the phase C may be connected to a first end of the sub-winding L1C of the phase C and a first end of the second power component TC21 of the phase C. A second end of the second power component TC21 of the phase C may be connected to the ground. To be specific, a second end A12 of the sub-winding L1A of the phase A, a second end B12 of the sub-winding L1B of the phase B, and a second end C12 of the sub-winding L1C of the phase C may be connected together.

The winding branches of the phase A may include an electronic element DA11 and an electronic element DA12. The winding branches of the phase B may include an electronic element DB11 and an electronic element DB12. The winding branches of the phase C may include an electronic element DC11 and an electronic element DC12. Each of the electronic element DA11, the electronic element DA21, the electronic element DB11, the electronic element DB21, the electronic element DC11, and the electronic element DC21 may be a freewheeling diode.

In each phase, at least two winding branches may wind to form a winding integral. For example, the windings of the phase A may include n winding branches connected in parallel. The n winding branches may include a sub-winding L1A, a sub-winding L2A, . . . , and a sub-winding LnA. The sub-winding L1A, the sub-winding L2A, . . . , and the sub-winding LnA may wind to form a winding integral LA. Similarly, the windings of the phase B may include a sub-winding L1B, the sub-winding L2B, . . . , and a sub-winding LnB, and the sub-winding L1B, the sub-winding L2B, . . . , and the sub-winding LnB may wind to form a winding integral LB. The windings of the phase C may include a sub-winding L1C, a sub-winding L2C, . . . , and a sub-winding LnC, and the sub-winding L1C, the sub-winding L2C, . . . , and the sub-winding LnC may wind to form a winding integral LC. The winding branches of the phase A, the winding branches of the phase B, and the winding branches of the phase C may be connected to form the motor.

In the present embodiment, each winding branch of the phase A, each winding branch of the phase B, and a winding branch of the phase C may be controlled independently. Therefore, the power component arranged on each winding branch may not be required to have an equal current, and the power component may be protected from being burnt.

Further, the present embodiment may use the low-power component to control the high-power motor, reducing manufacture costs of the motor.

In the present embodiment, the first power component may be any one selected from the group consisting of: an insulated gate bipolar transistor (IGBT), a metal-oxide-semiconductor field-effect transistor (MOSFET), a giant transistor (GTR), and an integrated gate commutated thyristor (IGCT); and the second power component may be any one selected from the group consisting of: an insulated gate bipolar transistor (IGBT), a metal-oxide-semiconductor field-effect transistor (MOSFET), a giant transistor (GTR), and an integrated gate commutated thyristor (IGCT). In other embodiments, other power components may be arranged as the first and the second power components.

The above description is to illustrate the embodiments of the present disclosure only, and does not limit the scope of the disclosure. Any equivalent structure or equivalent process transformation made based on the specification and the drawings of the present disclosure, which are directly or indirectly applied to other related technical fields, shall be within the scope of the present disclosure.

What is claimed is:

1. A high-power motor, controlled by parallelly connected windings, comprising windings of a plurality of phases, wherein
the windings of each phase comprise n winding branches and 2n power components;
the n winding branches are connected with each other in parallel; and
each of the n winding branches is controlled by two of the 2n power components independently from other winding branches, wherein the n is an integer greater than or equal to 1,
when the windings are connected to form a shape of a triangle, the windings of the plurality of phases are three-phase windings, the three-phase windings are windings of a phase A, windings of a phase B, and windings of a phase C; and
each winding branch of the phase A, the phase B, and the phase C comprises a first power component, a sub-winding, and a second power component;
a winding branch of the phase A comprises the first power component of the phase A, the sub-winding of the phase A, and the second power component of the phase A;

a winding branch of the phase B comprises the first power component of the phase B, the sub-winding of the phaseB, and the second power component of the phase B; and a winding branch of the phase C comprises the first power component of the phase C, the sub-winding of the phase C, and the second power component of the phase C; wherein a first end of the first power component of the phase A is connected to a positive pole of a power, and a second end of the first power component TA1$n$ of the phase A is connected to a first end of the sub-winding of the phase A, a first end of the sub-winding of the phase C, and a first end of the second power component of the phase A;

a second end of the sub-winding of the phase A is connected to a second end of the first power component of the phase B, a first end of the second power component of the phase B, and a first end of the sub-winding of the phase B, and a second end of the second power component is connected to a ground;

a first end of the first power component of the phase B is connected to the positive pole of the power, and a second end of the first power component of the phase B is connected to the second end of the sub-winding of the phase A, the first end of the second power component of the phase B, and the first end of the sub-winding of the phase B;

a second end of the sub-winding of the phase B is connected to a second end of the first power component of the phase C and a first end of the second power component of the phase C, and a second end of the second power component is connected to the ground; and a first end of the first power component of the phase C is connected to the positive pole of the power, and the second end of the first power component of the phase C is connected to a second end of the sub-winding of the phase C and the second end of the sub-winding of the phase B, and a second end of the second power component of the phase C is connected to the ground.

2. A high-power motor, controlled by parallelly connected windings, comprising windings of a plurality of phases, wherein the windings of each phase comprise n winding branches and 2n power components;

the n winding branches are connected with each other in parallel; and each of the n winding branches is controlled by two of the 2n power components independently from other winding branches, wherein the n is an integer greater than or equal to 1;

when the windings are connected in a star configuration, the windings of the plurality of phases are three-phase windings, the three-phase windings comprise windings of a phase A, windings of a phase B, and windings of a phase C; and each winding branch of the phase A, the phase and the phase C comprises a first power component, a sub-winding, and a second power component, a winding branch of the phase A comprises the first power component of the phase A, the sub-winding of the phase A, and the second power component of the phase A;

a winding branch of the phase B comprises the first power component of the phase B, the sub-winding of the phaseB, and the second power component of the phase B; and a winding branch of the phase C comprises the first power component of the phase C, the sub-winding of the phase C, and the second power component of the phase C; wherein a first end of the first power component of the phase A is connected to a positive pole of a power, a second end of the first power component of the phase A is connected to a first end of the sub-winding of the phase A and a first end of the second power component of the phase A, and a second end of the second power component is connected to a ground;

a first end of the first power component of the phase B is connected to the positive pole of the power, a second end of the first power component of the phase B is connected to a first end of the sub-winding of the phase B and a first end of the second power component of the phase B, and a second end of the second power component is connected to the ground; and a first end of the first power component of the phase C is connected to the positive pole of the power, a second end of the first power component of the phase C is connected to a first end of the sub-winding of the phase C and a first end of the second power component of the phase C, and a second end of the second power component of the phase C is connected to the ground;

wherein a second end of the sub-winding of the phase A, a second end of the sub-winding of the phase B, and a second end of the sub-winding of the phase C are connected with each other.

* * * * *